United States Patent
Heidemann et al.

(10) Patent No.: US 12,115,652 B2
(45) Date of Patent: Oct. 15, 2024

(54) REFERENCING POSE MANIPULATION SYSTEM FOR MARKER BASED TRACKING OF POSITION MEASUREMENT SYSTEM

(71) Applicant: FARO Technologies, Inc., Lake Mary, FL (US)

(72) Inventors: Rolf Heidemann, Stuttgart (DE); Matthias Wolke, Korntal-Münchingen (DE); Steffen Kappes, Dedheim-Degmarn (DE)

(73) Assignee: FARO Technologies, Inc., Lake Mary, FL (US)

( * ) Notice: Subject to any disclaimer, the term of this patent is extended or adjusted under 35 U.S.C. 154(b) by 313 days.

(21) Appl. No.: 17/326,555

(22) Filed: May 21, 2021

(65) Prior Publication Data
US 2022/0048199 A1 Feb. 17, 2022

Related U.S. Application Data

(60) Provisional application No. 63/066,447, filed on Aug. 17, 2020.

(51) Int. Cl.
*B25J 13/08* (2006.01)
*B25J 9/16* (2006.01)
*G06T 7/73* (2017.01)

(52) U.S. Cl.
CPC ........... *B25J 13/089* (2013.01); *B25J 9/1692* (2013.01); *B25J 9/1697* (2013.01); *G06T 7/73* (2017.01)

(58) Field of Classification Search
CPC . B25J 9/16; B25J 9/1697; B25J 13/089; B25J 9/1692; G06T 7/73;
(Continued)

(56) References Cited

U.S. PATENT DOCUMENTS

| 7,248,374 B2 | 7/2007 | Bridges |
| 10,089,415 B2 | 10/2018 | Grau |

(Continued)

OTHER PUBLICATIONS

Daniilidis, "Hand-Eye Calibration Using Dual Quaternions," GRASP Laboratory, Apr. 1998, 20 pages.
(Continued)

*Primary Examiner* — Adam R Mott
*Assistant Examiner* — Sagar Kc
(74) *Attorney, Agent, or Firm* — McCarter & English, LLP; Dave S. Christensen

(57) ABSTRACT

A system includes a pose manipulation system operationally that sets a pose of a position measurement system with respect to an object that is to be measured. The system further includes a pose tracking system configured to record a relative pose between a coordinate system associated with the position measurement system and a coordinate system of the object. The pose tracking system records a path along which the position measurement system is enabled to measure 3D coordinates of a surface of a type of an object, wherein recording the path comprises moving the pose manipulation system sequentially through a plurality of poses and recording, at each pose, the relative pose to measure the 3D coordinates. The pose manipulation system follows the path again, and the position measurement system measures the 3D coordinates by applying one or more of the recorded poses.

22 Claims, 9 Drawing Sheets

(58) Field of Classification Search
CPC ........... G05B 2219/39016; G05B 2219/39045; G05B 2219/39057
See application file for complete search history.

(56) References Cited

U.S. PATENT DOCUMENTS

| | | | |
|---|---|---|---|
| 10,445,216 B2 | 10/2019 | Mola | |
| 10,657,691 B2 | 5/2020 | Zweigle et al. | |
| 10,943,320 B2* | 3/2021 | Finn | H04N 23/60 |
| 11,010,919 B2* | 5/2021 | Rivera | G06T 7/62 |
| 11,055,532 B2 | 7/2021 | Frank et al. | |
| 2003/0212472 A1* | 11/2003 | McKee | G05D 1/0274 |
| | | | 318/568.12 |
| 2016/0129594 A1* | 5/2016 | Telling | B25J 9/161 |
| | | | 700/255 |
| 2018/0137646 A1* | 5/2018 | Kraszewski | G06T 7/73 |
| 2018/0321383 A1 | 11/2018 | Heidemann et al. | |
| 2019/0240843 A1* | 8/2019 | Pan | B25J 9/1653 |
| 2019/0261566 A1* | 8/2019 | Robertson | G06V 20/10 |
| 2021/0025717 A1* | 1/2021 | Mendez | G06T 7/73 |
| 2021/0086358 A1* | 3/2021 | Northcutt | B25J 9/1666 |
| 2021/0316449 A1* | 10/2021 | Wang | B25J 9/1664 |
| 2023/0030852 A1* | 2/2023 | Fu | B25J 9/1697 |

OTHER PUBLICATIONS

Geng, "DLP-Based Structured Light 3D Imaging Technologies and Applications," Proceedings of SPIE, vol. 7932, 2011, pp. 1-15.

Kavan et al., "Geometric Skinning with Approximate Dual Quaternion Blending," ACM Transactions on Graphics, vol. 27, No. 4, Oct. 2008, pp. 1-23.

Sharf et al., "Arithmetic and geometric solutions for average rigid-body rotation," Mechanism and Machine Theory, vol. 45, 2010, pp. 1239-1251.

Tsai et al., "A New Technique for Fully Autonomous and Efficient 3D Robotics Hand/Eye Calibration," IEEE Transactions on Robotics and Automation, vol. 5, No. 3, Jun. 1989, pp. 345-358.

* cited by examiner

REFERENCING POSE MANIPULATION SYSTEM FOR MARKER BASED TRACKING OF POSITION MEASUREMENT SYSTEM

CROSS REFERENCE TO RELATED APPLICATIONS

This application claims the benefit of U.S. Provisional Application Ser. No. 63/066,477, filed Aug. 17, 2020, the entire disclosure of which is incorporated herein by reference.

BACKGROUND

The present application is generally related to computer vision and is directed to technical solutions for training a robot to move to particular positions using the detection of photogrammetric markers.

Automation systems, which can include automated or semi-automated systems, such as robots, are used for several tasks in various environments, such as moving objects from one place to another in an industrial setting, performing surgical operations in a medical environment, etc. Position recognition systems are used to determine the position of and track a particular object in 3-dimensions (3D). In robot-assisted surgeries, for example, specific objects, such as surgical instruments, need to be tracked with a high degree of precision as the instruments are being positioned and moved by a robot or by a physician.

Automation systems may also be used for making 3D measurements. While existing systems can be trained to move to positions with a high level of repeatability, the accuracy of the position of the end of a robotic arm (e.g. where a tool or measurement device is positioned) is typically low. This limits the ability to use automation systems for metrology level measurements.

Further, when an automation system is programmed, it is the end positions that are designated by the operator/programmer. The automation system itself determines the path that is used to achieve these positions. Thus the position of the parts of the automation system at intermediate points may not be accurately known.

Accordingly, while existing automation systems are suitable for their intended purpose the need for improvement remains, particularly in a system having the features described herein.

BRIEF DESCRIPTION

According to one or more embodiments of the present invention, a system includes a pose manipulation system operationally coupled to a position measurement system, wherein the pose manipulation system is configured to set a pose of a position measurement system with respect to an object that is to be measured, wherein the position measurement system measures a 3D coordinate of a point in space. The system further includes a pose tracking system configured to record a relative pose between a coordinate system associated with the position measurement system and a coordinate system of the object. The pose tracking system records a path along which the position measurement system is enabled to measure 3D coordinates of a surface of a type of an object, wherein recording the path comprises moving the pose manipulation system sequentially through a plurality of poses and recording, at each pose, the relative pose to measure the 3D coordinates. The pose manipulation system follows the path again, and the position measurement system measures the 3D coordinates of the surface of the object by applying one or more of the recorded poses.

According to one or more embodiments of the present invention, a method for calibration of a pose manipulation system for tracking a position measurement system. The method includes recording a path of the pose manipulation system to perform an operation to acquire 3D coordinates of a surface of a type of an object by a position measurement system. Recording the path includes moving the pose manipulation system sequentially through a plurality of poses, at which the position measurement system measures the 3D coordinates of the object to operate on and the pose tracking system records a relative pose. Further, the method includes performing the operation on one or more objects of said type by causing the pose manipulation system to move sequentially along the poses in the path, and the position measurement system measuring the 3D coordinates and applying the recorded poses.

According to one or more embodiments of the present invention, a computer program product includes a memory device having computer executable instructions stored thereon, the computer executable instructions when executed by one or more processors perform a method. The method includes recording a path of the pose manipulation system to perform an operation to acquire 3D coordinates of a surface of a type of an object by a position measurement system. Recording the path includes moving the pose manipulation system sequentially through a plurality of poses, at which the position measurement system is enabled to measure the 3D coordinates of the object to operate on. Further, the operation is performed on one or more objects of said type by causing the pose manipulation system to move sequentially along the poses in the path, and the position measurement system measuring the 3D coordinates using one or more poses.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
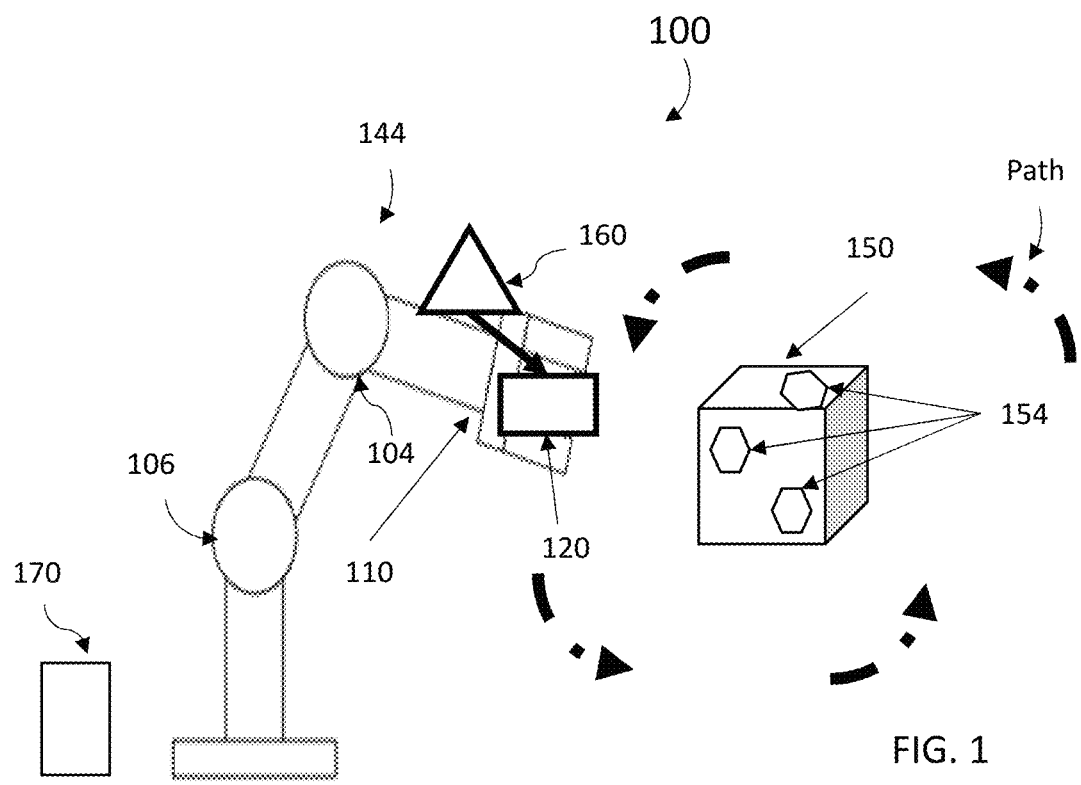
FIG. 1 depicts a block diagram of a system for recording a trajectory of a pose manipulation system to move to a particular position according to one or more embodiments.

The detailed description explains embodiments of the invention, together with advantages and features, by way of example, with reference to the drawings.

DETAILED DESCRIPTION

Embodiments of the present invention provide technical solutions to measure positions on an object using automation. The positions are measured using one or more position markers. A pose manipulation system, such as a robot, can be used to automate the position measurements by a position measuring device. A pose tracking system facilitates recording relative poses of the position measuring device to facilitate automating the position measurement. One or more embodiments relate to a combination of a marker-based tracking of a 3D measurement sensor and a mechanical manipulator, e.g., a robotic arm of the robot. Typical robotic arms do not have absolute accuracy, which means that a set position of a tool mounted to the end effector of the robotic arm can deviate from the actual position that a user intends for the robotic arm to be at. This limits the capabilities to use these arms in accuracy-related measurement tasks. On the other hand, robots have repeatability, which means that programmed positions within a path are reached with minimum error from one execution of the path to the next. Embodiments use such repeatability so that the robot can be used for repetitive measurements on similar objects, e.g., for inline inspection.

It should be noted that while a robot is described as an example of the pose manipulation system, embodiments of the present invention are not limited to "robots" and in one or more embodiments of the present invention, the pose manipulation system can include other types of automation systems that mechanically manipulate the pose of the position measuring device (or object). For example, the pose manipulation system can include a transport system such as a conveyor belt, an automated cart, or any other such automated or semi-automated mechanical manipulation system.

Existing systems, to accurately measure the position of the robot, use retroreflectors that are placed on the robot and that are tracked using a tracking device, such as a laser tracker. This is time consuming, has line of sight limitations, and is expensive.

Embodiments address such technical challenges using the detection of photogrammetric markers (referred herein as "markers") with a camera-based 3D position measurement device. In one or more embodiments of the present invention, the position measurement device is placed on/attached to a pose manipulation system, such as a robot. The tracking of the markers with the 3D measurement device, e.g., by matching markers from one frame to the next, is used to determine the position of the measurement system and the pose manipulation system with respect to the markers. In one or more embodiments, a predetermined object, which can be made for this purpose, is used for such tracking of the pose manipulation system. The predetermined object is at least similar to the object that will be measured repetitively and equipped with at least a predetermined number of markers for accurate tracking. As used herein, the predetermined object is similar to the actual object when the predetermined object is substantially the same size or shape as the object that will be measured. Such a predetermined object is placed in front of the pose manipulation system, and a measurement path of the position measurement device is programmed to measure the object. While the path is executed, the position measurement device tracks itself with the help of the photogrammetric markers.

Independent of the accuracy of the pose manipulation system, the accurate path of the measurement device around the measured object is now determined. All subsequent measurements which use the same path of the pose manipulation system are, with high reliability, the same or equal to this pre-recorded measurement. Hence, instead of using the assumed positions of the measurement device provided by the pose manipulation system, an interpolated accurate position based on the actual path of the measurement device can be used to improve the overall measurement accuracy.

It should be noted that the positions of the pose manipulation system are not usually tracked during movement. The programmer/user moves the pose manipulation system to a position (e.g., desired position), and subsequently, the pose manipulation system determines a path to move to that desired position from a previous or another position.

FIG. 1 depicts a block diagram of a system for recording a trajectory of a pose manipulation system to move to a particular position according to one or more embodiments. One or more positions of the pose manipulation system can be stored as a path to be followed by the pose manipulation system. The path can include a sequential list of the positions of the pose manipulation system. The measuring device 120 facilitates measuring 3D coordinates of the object 150. In one or more embodiments, the object 150 is a predetermined object that is used to "train" the robot 144 to follow a particular trajectory by recording particular poses of the measuring device 120 from which the measuring device 120 captures measurements of the object 150. In such cases, the object 150 includes one or more markers 154. For example, the markers 154 can be labels, stickers, reflectors, or other such items that are predetermined to be used as photogrammetry markers by the measuring device 120. In one or more embodiments, some photogrammetric markers 154 can be measured from an observation angle larger than 120°.

In one or more embodiments, the markers 154 are placed on a place-holder of the object 150 so that the markers 154 do not have to be repeatedly removed and applied to several objects 150. The pose manipulation system is depicted as a robot 144 that can manipulate the position of a measuring device 120. Although a robot 144 is depicted, it is understood that in other embodiments, the pose manipulation system can be of a different type, e.g., conveyor belt, automated guided vehicle, etc., or a combination thereof. For example, in one or more embodiments, the object 150 that is under inspection/operation is located on an automated guided vehicle (AGV) and passing in proximity to the robot arm 110. It should be noted that although a particular type/shape/form of the position manipulation system is shown in FIGS. herein, the position manipulation system can be of different form/shape in one or more embodiments, and the claims should not be so limited. For instance, in one or more embodiments, the pose manipulation system can have articulated arms, be a gate, an arch, a strip, or any of any other form equipped with one or more measuring devices 120 for acquiring visual data. For example, the AGV can be passed through the gate or within the scanning range of the measuring devices 120. The AGV can be equipped with the markers 154 for facilitating position tracking of the measuring device 120. In one or more embodiments, the measuring device 120 is an array of sensors. With several measuring devices 120 in an array, several markers 154 can be observed by at least one measuring device 120. In examples described herein, the markers 154 are described to be equipped on the object 150. However, in one or more embodiments, the markers 154 can be on a place-holder, such as the AGV, on which the object 150 is placed.

In an embodiment, the measuring device 120 may be a 3D coordinate measurement device, such as that described in commonly owned U.S. Pat. Nos. 10,445,216 or 10,089,415, or in United States Patent Publication 2018/0321383, the contents of all of which are incorporated herein by reference.

In one or more embodiments, the object 150 that includes the markers 154 is a placeholder or representative for a collection of objects that are to be operated on by the robot 144. For example, the object 150 is the same type of object as is to be later measured repeatedly by the measuring device 120 that is manipulated by the robot 144. Alternatively, the object 150 is an object of a standard/known size, e.g., a cube, of a similar size as the later object that is to be measured repeatedly. Alternatively, the object 150 is a hollow object like a scaffold that has substantially the same size of the object that is to be later measured. In such cases, the photogrammetric markers 154 can be placed in such a way that they can be seen from several sides, e.g., also from the opposite side observed through the scaffold. This increases the number of observations and observation angles per marker, which in turn leads to improved tracking accuracy.

Accordingly, during a first phase (training/recording/tracking phase), the pose manipulation system, such as the robot 144, is operated to perform the one or more operations using the object 150, and subsequently, during a second phase (inference/application/post-tracking phase), the robot 144 automatically operates on the other objects according to the operations from the first phase. The other objects may or may not include the markers 154.

During the first phase, using the markers 154 and the object 150, a pose of the measuring device 120 is determined. A pose of the position manipulation system, i.e., robot 144, can be determined from the pose of the measuring device 120 using a pre-calibrated transformation matrix. The transformation matrix provides a relationship between a frame of reference of the robot 144 and the measuring device 120. A "pose" of the measuring device 120 indicates the location of the measuring device 120 and also its orientation, i.e., rotation, etc. The pose of the measuring device 120 can be represented using a matrix. The pose can be described by means of a rotation transformation and a translation transformation that bring the measuring device 120 from a reference pose to the observed/desired pose. The position and orientation can be relative to a predetermined coordinate system.

Figure 2:
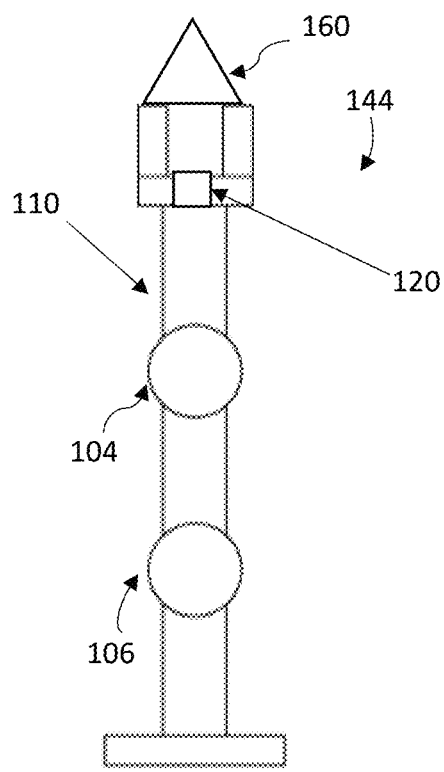
FIG. 2 depicts an "in-use" shape of the robot that differs from the form that is depicted in FIG. 1.

The robot 144 is capable of reshaping itself by actuating one or more components or parts (e.g., an arm) 110 about one or more axes 104, 106. It should be noted that the embodiments herein are described using robot 144; however, in other embodiments, the robot that is in consideration can be of other type and/or form. It should be noted that the robot 144 depicted herein is shown with two joints 104, 106 that can change the pose of the robot 144. However, in other examples, the robot 144 can include any other number of joints, and the joints can facilitate a change in shape in a different manner than what is depicted. FIG. 2 depicts an "in-use" shape of the robot 144 that differs from the shape that is depicted in FIG. 1.

Further, the robot 144 includes a dynamic machine vision sensor (DMVS) 120 at a predetermined location. In an embodiment, the measuring device 120 is the same as the 3D measurement device described in the aforementioned United States Patent Publication 2018/0321383. In one or more embodiments, the measuring device 120 captures 3D data while the measuring device 120 is moved by the robot 144. Alternatively, or in addition, the measuring device 120 captures 2D images while the measuring device 120 is moved by the robot 144. For example, the 3D data that is captured includes a 3D point cloud, and the 2D images include colored and/or grayscale images.

In one or more embodiments, the system 100 includes a tracking device 160, which is a pose tracking system, such as a laser tracker. In one or more embodiments of the present invention, the tracking device 160 is external to the measuring device 120. In other embodiments of the invention, the tracking device 160 is part of the measuring device 120, thus, enabling the measuring device 120 to be self-tracking. In an embodiment, the laser tracker is the same as that described in the aforementioned United States Patent Publication 2018/0321383. The tracking device 160 tracks the measuring device 120 in six degrees of freedom during particular phases, such as the first phase. The tracking device 160 measures 3D coordinates of the measuring device 120. In one or more embodiments, the tracking device 160 is a laser tracker that measures the 3D coordinates by tracking a laser beam to a retroreflective target, in this case, positioned on, or in a known geometric relationship, with the measuring device 120. The tracking system 160 can be a coordinate measuring machine that is immobile in one or more embodiments.

Further, in one or more embodiments, the system 100 includes a controller 170. The controller 170 is a computing system that includes one or more processors and memory devices, along with other peripherals and components that facilitate executing one or more computer-readable instructions. The controller 170 can be coupled with the measuring device 120, the tracking device 160, and one or more actuators (not shown) of the robot 144. The controller 170 can send data and instructions to facilitate controlling the operations of the measuring device 120, the tracking device 160, and the robot 144. For example, the controller 170 can control the pose or configuration of the robot 144 and facilitate the robot 144 to move through a path. Alternatively, or in addition, the controller 170 can control the tracking device 160, for example, to record a pose of the measuring device 120 in response to an instruction. For example, the controller 170 can cause the tracking device 160 to record a pose in response to the robot arm 110 being at a particular location that corresponds to a particular marker 154.

Figure 3:
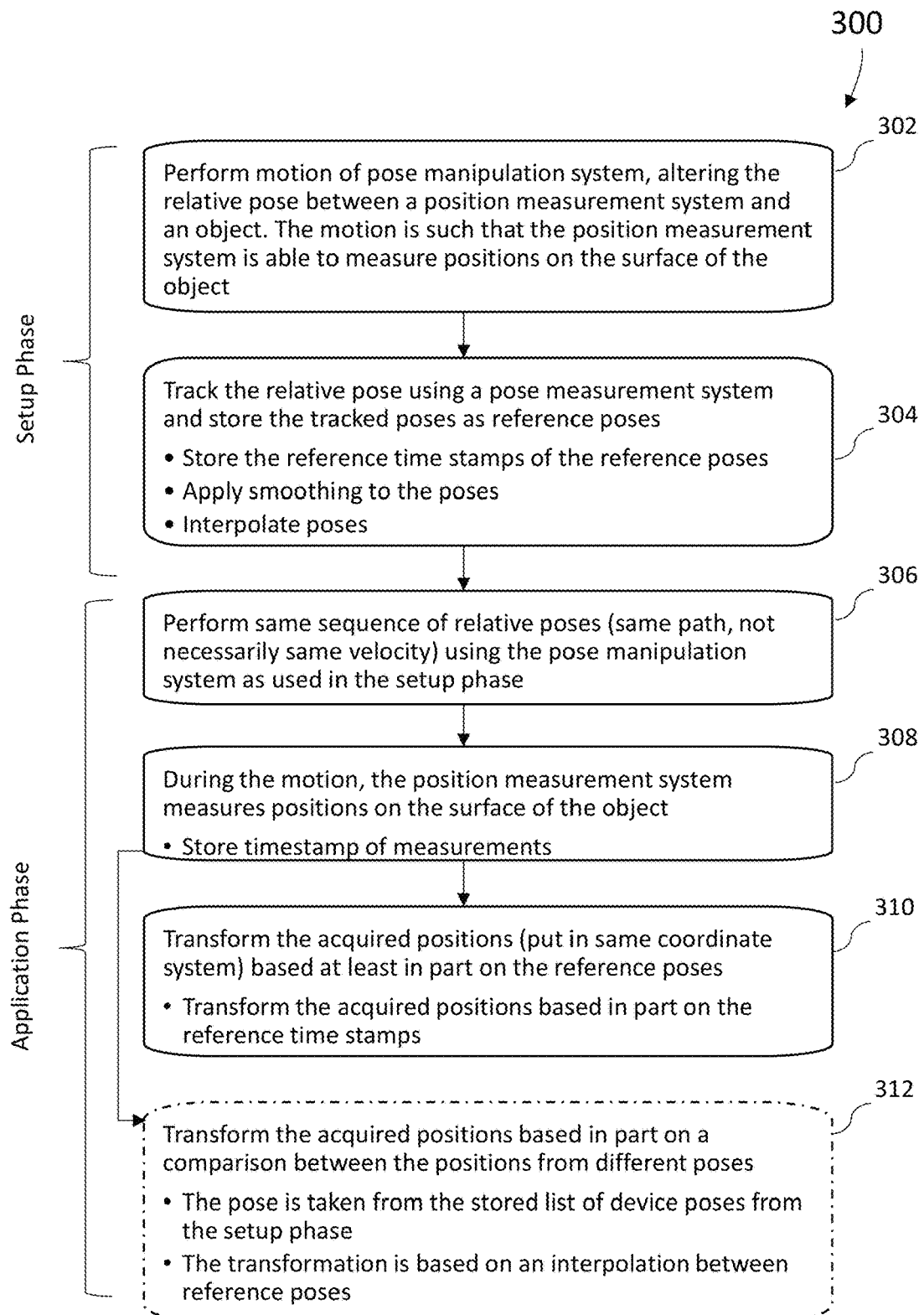
FIG. 3 depicts a flowchart of a method for generating a path for repetitive operations on objects by the robot according to one or more embodiments.

FIG. 3 depicts a flowchart of a method 300 for generating a path for repetitive operations on objects by the pose manipulation system according to one or more embodiments. In the first phase, the system 100 is setup to track the relative pose of the measuring device 120 while it is used to measure the positions on the object 150. The method 300 facilitates the measuring device 120 to estimate its path based on the observation of retroreflective marker, where the path is how the position manipulation system, e.g., 144 moves the measuring device 120. The measuring device 120 can use the pose tracking device 120, which may be part of the measuring device 120, or may be external to the measuring device 120. The method 300 includes measuring the object 150 with the measuring device 120 and determining, the position of the measurement device 120 during the measurements being taken, at block 302. This includes performing motion of pose manipulation system, i.e., the robot 144, altering the relative pose between the measuring device 120 and the object 150. The motion is such that the measuring device 120 is able to measure positions on the surface of the object 150. This includes the robot arm 110 being moved from one pose where there is a plurality of marker 154 within the field of view to another pose which has a plurality of markers 154 within its field of view. In the case where the tracking system 160 is part of the measuring device 120, at least three photogrammetry markers 154 are to be in view of the measuring device 120.

It should be noted that in one or more embodiments, different type of markers 154 can be used, such as polarization enhanced markers, which have structures that require to be observed by specific hardware. When using such type of markers, a single marker 154 may be sufficient to perform the tracking. Such markers are described in U.S. Pat. No. 7,248,374, content of which is incorporated herein in its entirety.

In the case where the tracking system 160 is external, fewer number of photogrammetry markers 154 or no photogrammetry markers can facilitate determining the pose of the position measurement system. In the case of an external tracking system 160 a fewer number of markers can be used. The markers 154 which are observed in pose one and pose two do not need to be the same.

For example, while the robot arm 110 is at the first pose, a position of the measuring device 120 is captured, and a timestamp of the capture is stored together with this pose. When the robot arm 110 is at the next pose, a second position and a second timestamp are captured.

The tracking of markers 154 can be performed using any photogrammetric techniques that are presently known or will be known in the future. The markers 154 are designed to have a contrast edge in the image data, which is recorded by the measuring device 120. Furthermore, the markers 154 have a shape that allows accurate detection of a particular point/portion of the marker 154, for example, the center (2D in the image and 3D in space). For example, such conditions can be met with the markers 154 of the type retroreflective circular or spherical markers. In one or more embodiments, the markers 154 do not need special coding, i.e., a single dot can be sufficient.

In one or more embodiments, 2D markers 154 are used. To extract 2D marker positions in images that are recorded by the measuring device 120, image processing methods can be used alone or in a combination. Such image processing methods can include thresholding, watershed segmentation, edge/contour detection, ellipse fitting, center of mass calculation, and the like. Further, the 3D position of a marker 154 can be calculated in a calibrated stereo camera system of the measuring device 120 using triangulation. The measuring device 120 is calibrated, so that camera parameters (intrinsic and extrinsic parameters) are known and a scaled 3D point as the position of the marker 154 can be calculated. With a sparse distribution of points, such 3D triangulation can be performed without coded markers in one or more embodiments. In the case of measuring device 120 using a monocular system, the 3D calculation can be done by triangulating 2D positions between different camera positions.

Tracking the pose of the measuring device 120 can be based on the 2D marker centers, which are detected in each image captured by the measuring device 120. These centers can be followed from in each 2D frame captured by the measuring device 120 for marker identification. In the case of coded markers being used, such repetitive detection is not performed.

In the case 3D positions of markers are used, the markers 154 can be identified and therefore tracked either by following them from one frame to the next frame or by comparing relative 3D distances, which can give a unique fingerprint for each marker 154.

The robot arm 110 is moving continuously, rather than moving to discrete points. Accordingly, the controller 170 determines when a position/pose is to be determined or interpolated. For example, when the controller 170 determines that the robot arm 110 is at a position that corresponds to one of the previously stored poses, the controller 170 transforms the recorded 3D data from measurement device 120 according to the previously recorded pose. The decision which pose to use on the current measurement can be taken by using the timestamps which can be taken relative to a measurement specific start time e.g., the time where the robot begins to move. When the robot arm 110 is not in a position that corresponds to one of the previously recorded poses, the controller 170 interpolates the pose of the robot arm 110 based on the poses in which relative timestamps are close to the relative timestamps of the recorded poses.

In one or more embodiments, during the recording of the poses with the representative object 150, the captured information includes a list with 6 DoF (degrees of freedom) poses of the measuring device 120 as the robot arm 110 measures the object 150. Further, the captured information includes one timestamp for each recorded pose.

In one or more embodiments, in the first phase, the user can move the pose manipulation system, such as the robot 144 from one pose to another manually. For example, the user can enter a command via the controller 170 to move the pose manipulation system from one pose to another and adjust each pose such that the measuring device 120 can detect the markers 154 on the predetermined object 150. Alternatively, or in addition, the user can manually and physically move the pose manipulation system from one pose to another and adjust the pose so that the marker 154 can be detected and registered by the measuring device 120. Once the controller 170 determines that the marker 154 has been detected and/or registered, the controller 170 can record the pose via the tracking device 160. In addition, the timestamp of the recording is recorded.

The method 300 further includes determining, by the controller 170, a path for the pose manipulation system, such as the robot 144, to complete the operation for the object 150 using the recorded reference poses, at block 304. The path is stored by tracking the relative pose of the measuring device 120 and storing the tracked poses as reference poses. Storing the path can include storing the timestamps at which the reference poses of the measuring device 120 are captured.

Further yet, in one or more embodiments, the poses are smoothed to even out any potential shaking. For example, the shaking can be caused by the manual/hand movement. The smoothing can be performed using Kalman filter, or other known techniques.

Further, generating the path can include determining additional poses by interpolating between two successive reference poses to determine an interpolated pose. 6 DoF interpolated position can be determined using several known techniques. For example, the interpolation can be performed using nearest neighbor algorithm. Alternatively, a weighted average of two nearest neighbor 6 DoF positions is determined where the interpolated position is located between the two neighbors. It is noted that in other embodiments, the interpolation can be done in more elaborate ways, e.g., based on dual quaternions, the weighted average of several near neighbor 6 DoF positions, non-linear interpolation methods like splines, etc. Regardless of the type of interpolation technique used, the accuracy improves with the density of measured reference positions. In one or more embodiments, the frames are recorded with at least 30 frames per second (fps) to reduce errors. The more reference poses the user specifies, the more control he has over the resulting path. The path thus created is stored by controller 170. The path includes the list of poses, including the reference poses and the timestamps for each pose. The reference poses can include interpolated poses in an embodiment.

In one or more embodiments, as a preparation, the reference poses may be manipulated/adjusted before feeding them into the controller 170, at block 306. Such adjustments can include applying a global transformation. The global transformation is applied because robot 144 can have its own coordinate system, and a manual measurement may not have any defined coordinate system. Accordingly, to overcome such a challenge, a transformation is determined for every single manual pose to convert the 6 DoF into a predetermined robot coordinate system. This can be done with the knowledge of three points/markers on the object 150. The coordinates of these points can be put manually into the robot coordinate system.

Further, in one or more embodiments, with images acquired at 30 fps or even higher, the manual measurement will deliver many poses, but only a fraction of these may be useful. Hence, the controller 170 subsamples the poses that are on the path between successive reference poses, at block 308. For example, the subsampling is performed using a predetermined parameter. For example, the subsampling delivers 1 pose per second of movement of the robot arm 110; or 1 pose per 10 cm movement of the robot arm.

Figure 4:
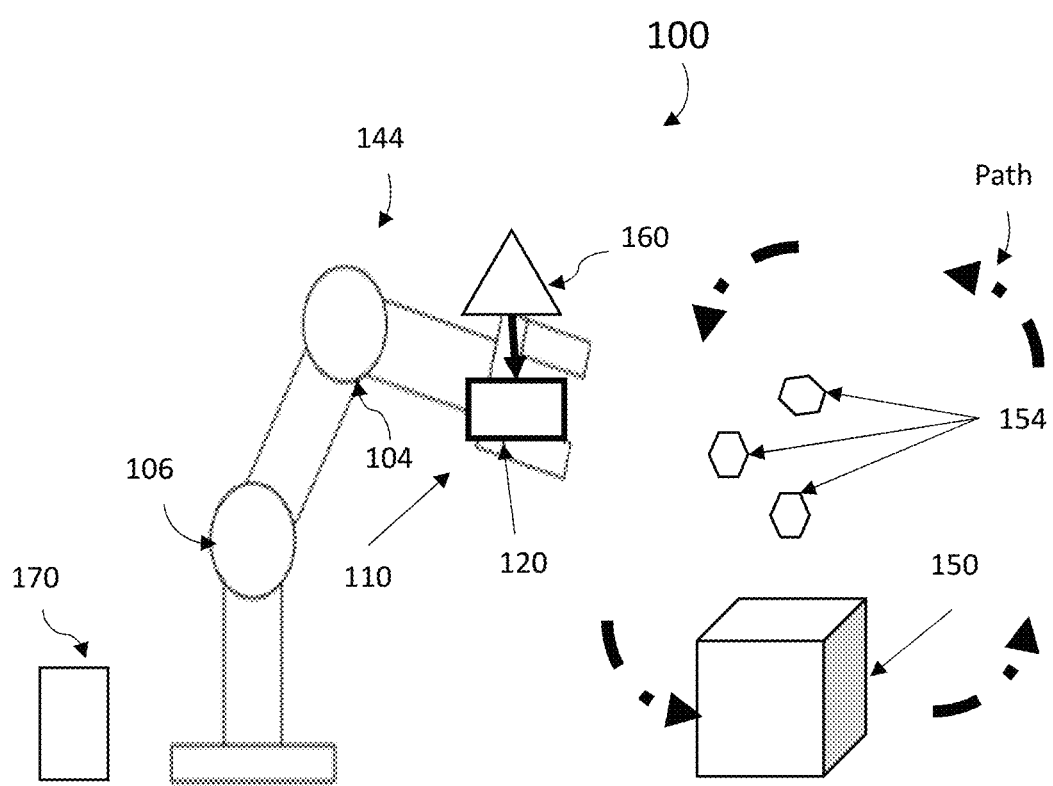
FIG. 4 depicts a block diagram of a pose manipulation system moving a measuring device to measure an object using pose tracking according to one or more embodiments of the present invention.

Further, during the application phase, system 100 follows the path that is generated in this manner to operate on other objects for measurement of that object, at block 306. FIG. 4 depicts a block diagram of a pose manipulation system moving a measuring device to measure an object using pose tracking according to one or more embodiments of the present invention. In one or more embodiments, the objects being measured may not include the markers 154. Rather, the robot 144 is moved along the list of poses in the stored path. The movement may use the timing based on the timestamps stored in the path. For example, the difference between the timestamps is used as a timing sequence to cause the robot arm 110 to move along the poses stored in the path. Alternatively, the robot arm 110 may move at a different velocity that does not match the timestamp sequence stored in the path.

During the motion of the robot along the stored path, the measuring device measures positions on the surface of the object 150, at block 308. The timestamp of these measurements is also recorded along with the position measurements.

The controller 170 transforms the acquired positions from the measuring device 120 based at least in part on the reference poses from the stored path, at block 310. Here, the transformation includes converting the acquired positions to same coordinate system as the reference positions. In an embodiment, the reference timestamps are used to perform the transformation. The timestamps of the reference path and of the measurement frames can be normalized e.g. by referencing them to the first frame/pose. This way, the timestamps from the measurement can be used to find a corresponding position in the reference path. The timestamps are not an exact match. Hence, a pose for a measurement frame is found by interpolation of poses in the reference path which have a similar timestamp than the measurement frame. If the reference recording was performed with different manipulation velocities, the timestamps may be adjusted accordingly i.e. by applying the known factor of speed difference.

Alternatively, the controller 170 transforms the acquired positions from the measuring device 120 based at least in part on a comparison between the positions from different poses that are in the stored path, at block 312. For example, the pose of the measuring device is compared with the poses that are in the stored path to determine a stored pose that is closest to the present pose. If the difference between the stored pose and the present position is within a predetermined threshold, the position associated with the stored pose is used as the acquired position. In one or more embodiments of the present invention, if the predetermined difference is not met with any of the stored poses, the controller 170 determines the position by interpolating between the two next-closest poses. The interpolation can be performed as described herein.

It can be beneficial to maintain the tracking of at least some frames of the measurement path. This could be achieved by using an external tracking device to determine the poses of the position measurement device for a sub-set of frames which may be some determined frames at the beginning or end of the recording or otherwise distributed over the measurement path.

When the pose tracking is done by the position measurement device by means of recording photogrammetric markers, there may be some markers permanently distributed next to the object and the path is prepared that some frames can record these markers. This tracked pose information in the measurement path can be used to identify and correct any timestamp offset or to identify and optionally correct for eventual path differences between the measurement path and reference path. With multiple frames distributed over the measurement path which are being tracked during measurement e.g. a number of frames at the beginning and a number of frames at the end of the path, the corrections to be applied can be further improved.

In the case that the tracking device 160 is external to the measurement device 120, the tracking device 160 and the robot arm 110 may be synchronized or calibrated. The marker tracking can also be used for accurate calibration of the measuring device 120 on the robotic arm 110. Such calibration can be performed using known techniques. For example, when the measuring device 120 is moved by the robot arm 110 over a set of photogrammetric markers 154, the controller extracts pose pairs of the robot 144 (in the robot coordinate system) and the measuring device 120 (in the objects coordinate system). With several of these poses, the relative orientation between the measuring device 120 and the robotic arm 110 can be calculated. Prominent algorithms to accomplish this task include dual quaternion algorithm, and fully autonomous and efficient robotics hand-eye calibration, among other known techniques. Using a continuum of poses from tracking rather than isolated poses (which is the typical approach) introduces a high level of redundancy. This provides advantages in compensating for the inaccuracies of the robot poses.

It should be noted that a sensor-to-sensor calibration (with or without a robotic arm 110) can be done in a similar way. Here, two or more sensors record a scenery of photogrammetric markers and deliver simultaneous position information regarding the object. The subsequent calculation may be performed with at least the same algorithms mentioned above.

In one or more embodiments, the tracking-based pose information of the measuring device 120 on the robotic arm 110 is used to return information to the controller 170 to improve the path created for the robot 144. For this, a feedback loop is set up for the controller 170 to adjust the path of the robot per the feedback loop in one or more embodiments. Alternatively, the calibration parameters of the robot 144 are changed based on the accurate measurements (e.g., the element lengths, the joint positions, etc.) to adjust the path.

Figure 5:
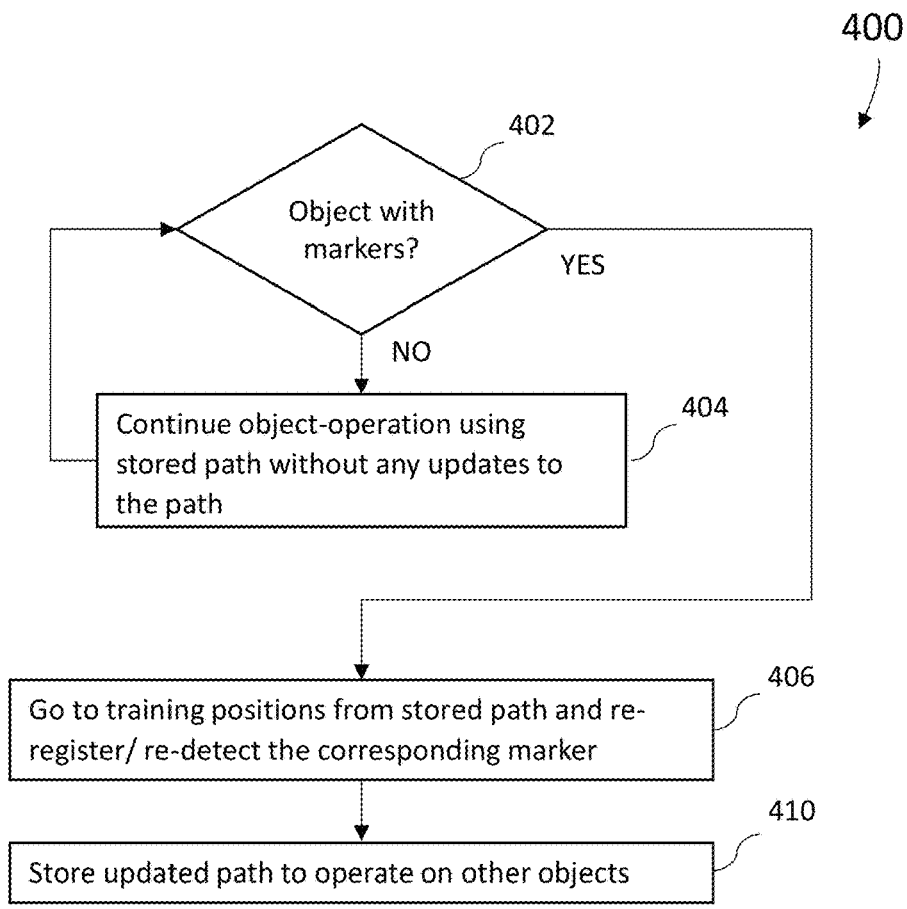
FIG. 5 depicts a method for updating a stored path for a robot according to one or more embodiments.

FIG. 5 depicts a method 400 for updating a stored path for the robot 144 according to one or more embodiments. The method 400 includes identifying that an object 150 is introduced to be operated on, where the object 150 includes one or more markers 154, at block 402. For example, the predetermined object 150 or any other object that is equipped with the markers 154 is used by the user to trigger a path reconfiguration/adjustment/maintenance. The object 150 used for such maintenance includes the markers 154 at predetermined locations. In one or more embodiments, the user can explicitly command the controller 170 to initiate a path maintenance mode where the controller 170 expects the predetermined object 150 to be handled.

If the object 150 does not have any markers, the method 400 includes continuing to perform the operation as per the stored path without any modifications to the path, at block 404. Alternatively, once the object 150 with markers 154 is detected, the controller 170, at each reference pose in the path provides that the marker can be detected, at block 406. In one or more embodiments, the controller 170 re-registers the reference poses upon detecting the corresponding markers 154. Re-registering or re-detecting the marker 154 includes recording a new pose from the tracking device 160.

In an embodiment, once the reference poses are re-registered using the tracking device 160, the controller 170 may perform the interpolation to determine the poses between successive reference poses. In one or more embodiments, the interpolation is performed between two successive reference poses only if both poses were substantially changed by the re-registering. If the earlier pose and new pose (upon re-registration) are substantially the same, the interpolation is not performed. The other operations of subsampling, smoothing, and converting to a common coordinate system are also performed as described herein, if the interpolation is performed. The updated path is stored at block 410.

It should be noted that in this case, the user does not have to move the robot arm 110 manually. Rather, the stored path is used to move the robot arm 110 autonomously, and accordingly, the path update/adjustment/maintenance can be performed completely autonomously.

Figure 6:
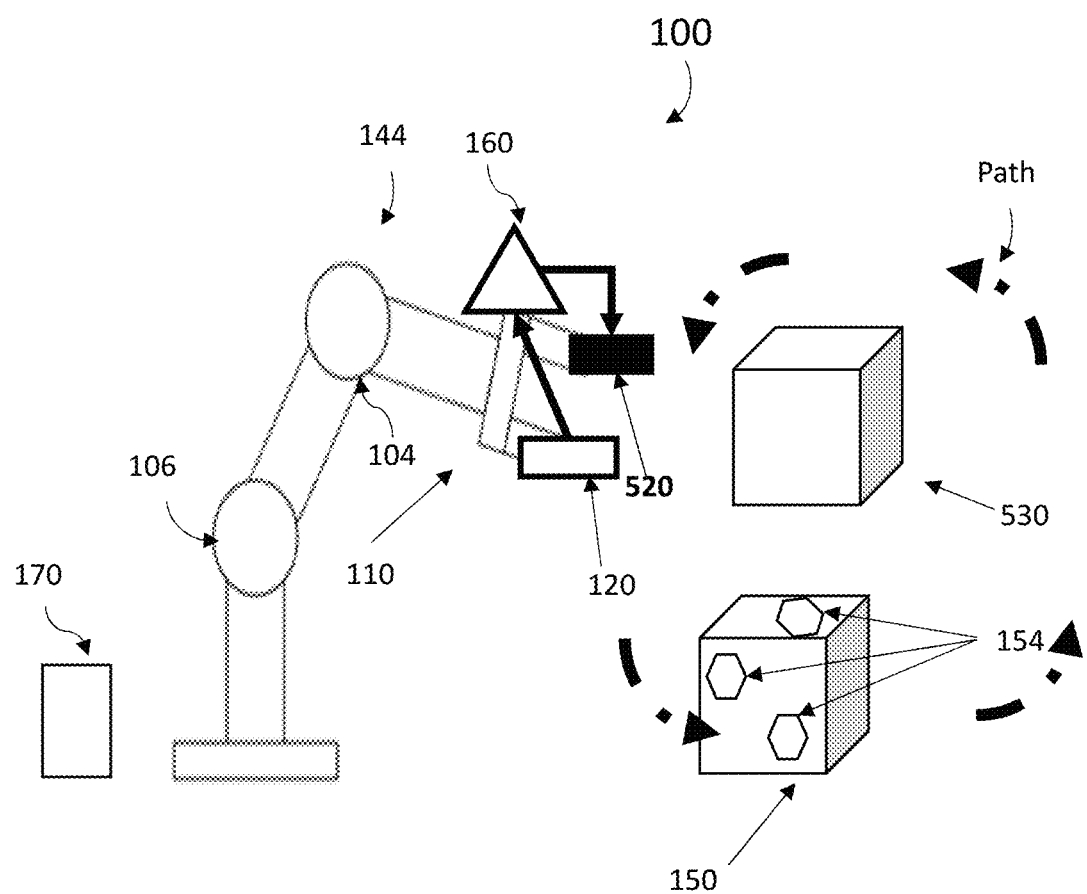
FIG. 6 depicts a system according to one or more embodiments.

FIG. 6 depicts a system 500 according to one or more embodiments. The system 500 includes components similar to those in system 100 (FIG. 1), and description is not repeated for such similar components. The differences in the two systems, system 100 and system 500, include that the robot 144 in the system 500 has at least two measuring devices—the first measuring device 120 and a second measuring device 520. Here, the robot arm 110 includes the two measurement devices rigidly attached to the same robotic arm 110. The rigid attachment the pose of device facilitates for a transformation matrix to be generated which describes the sensor-sensor-transformation between the two measuring devices. In this way, only the first measuring device 120 can be used to track the pose of the robot arm 110 using a predetermined object 150 that has one or more markers 154 using techniques described herein. Further, the second measuring device 520 can be used to perform one or more measurements with other objects, with or without markers 154, while the first measuring device 110 is only used for training and position tracking. The second robot arm 510B includes a measuring device 520.

Figure 7:
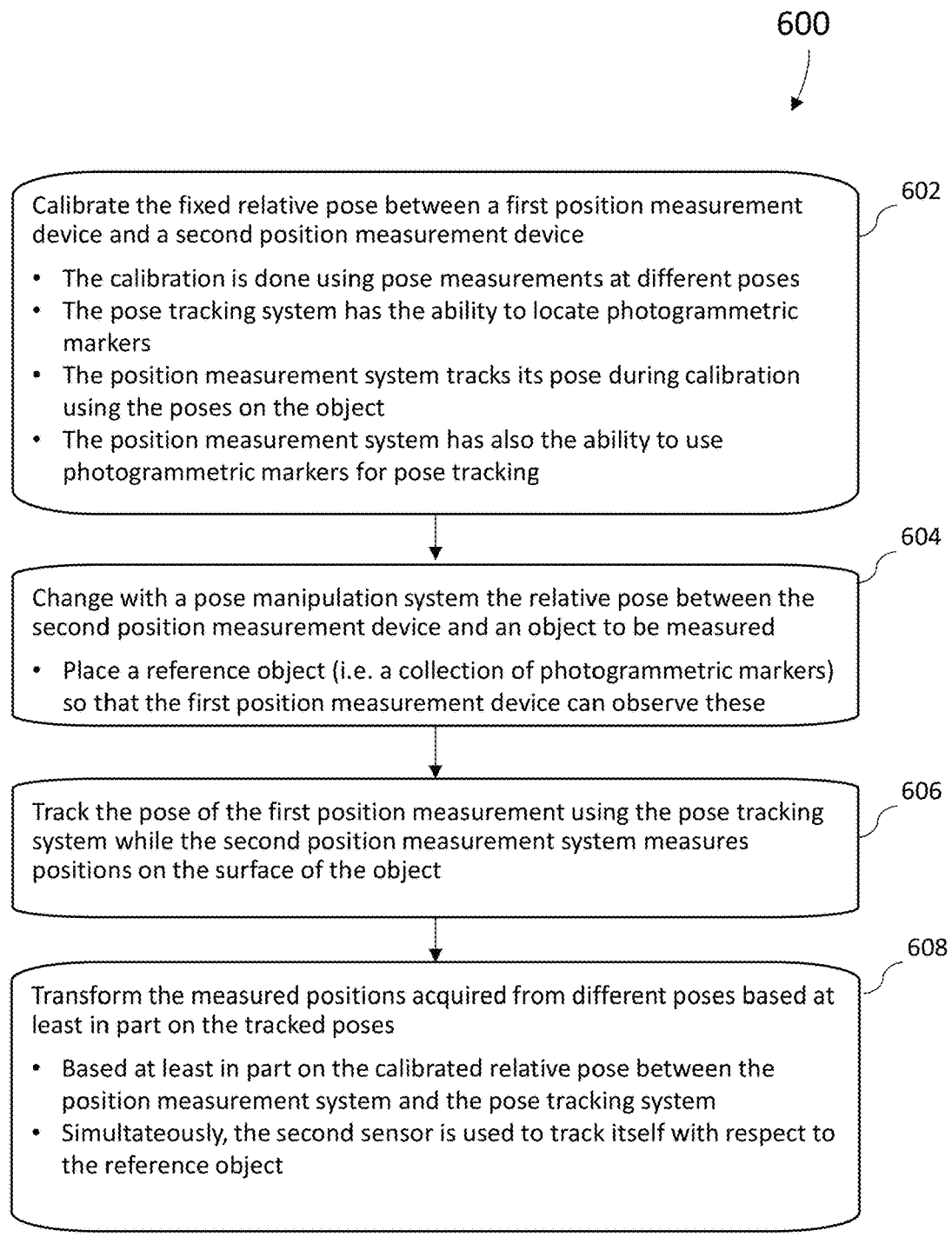
FIG. 7 depicts a flowchart of a method 600 for positioning a second measuring device based on a first measuring device that is being tracked using a pose tracking device according to one or more embodiments.

FIG. 7 depicts a flowchart of a method 600 for positioning a second measuring device 520 based on a first measuring device 120 that is being tracked using a pose tracking device according to one or more embodiments. The method 600 facilitates obtaining the measured 3D coordinates/positions on object 530 using the object 150 (see FIG. 6), which is an arbitrary reference object. The reference object 150 may assist in the pose estimation for the first measuring device 120. The shape or size of the object 150 may not be related to those of the object 530.

The method 600 includes calibrating a fixed pose between the first measuring device 120 and the second measuring device 520, at block 602. The pose tracking system 160 used to calibrate the fixed pose can be part of the first measuring device 120, or a component that is external to the measuring device 120. The calibration includes using position measurements at different poses. In one embodiment, the pose tracking system 160 can locate the photogrammetry markers 154. The fixed relative pose can include a pose at which a predetermined set of the photogrammetry markers 154 are visible to the measuring device 120. The measuring device 120 tracks its pose during calibration using the poses on the object 150. In the case that the object 150 has the markers 154 attached, the measuring device 120 tracks the poses to measure the object using the markers 154.

The calibration includes registering a first coordinate system of the first measuring device 120 with a second coordinate system of the second measuring device 520. Such a registration facilitates to determine a pose of the second measuring device 520 given a pose of the first measuring device 120, or vice versa. The registration can be represented by a matrix that provides a conversion of one or more 3D coordinates from the first coordinate system to the second coordinate system or vice versa.

The method 600 further includes changing, with the pose manipulation system, such as the robot 144, the relative pose between the measuring device 520 and the object 530, at block 604. In an embodiment, the first measuring device 120 measures a pose using the markers 154 on the object 150 as the pose manipulation system is moving the measuring devices.

Further, the pose tracking system 160 tracks the pose of the first measuring device 120 while the second measuring device 520 measures positions on the surface of the object 530, at 606. The pose of the first measuring device 120 is continuously tracked based on the robot arm 110 moving according to the path that was generated using the predetermined object 150 as described herein (method 300). The object 150 is not moved, and the robot arm 110 continuously operates along the path with the tracking device 160 recording the pose of the measuring device 120 in response to the measuring device 120 detecting a marker 154 on the object 150. Here, the object 150 is a fixed structure which has photogrammetric markers 154.

The method 600 further includes the second measuring device 520 determining positions on a second object 530. The second object 530 is another object that is to be measured. Alternatively, in one example, the second measuring device 520 also measures positions on the object 150 itself. With the pre-known sensor-to-sensor calibration, the pose of the first measuring device 120 can be transferred to the second measuring device 520, which can be measuring a separate object 530. Accordingly, in response to a first pose of the first measuring device 120 being detected, the controller 170 operates the robot arm 110 in a particular way. For example, the controller 170 commands the robot arm 110 to perform the poses as per the stored path.

The measured positions, from the different poses, captured by the second measuring device 520, are transformed based at least in part on the tracked poses of device 120, at block 608. In an embodiment, the transformation is performed based at least in part on the calibrated relative pose between the measuring device 120 and the measurement device 520. In an embodiment, the second measuring device 520 and the first measuring device 120 track themselves substantially simultaneously with respect to the reference object using their respective pose trackers. The separate pose trackers in each measuring devices are collectively referred to as the pose tracking system 160. It should be noted that in one or more embodiments, only the device 120 tracks itself, and that information is carried over to track the measuring device 520 (without measuring device 520 tracking itself).

Accordingly, the operation path is accurately known for each execution by the second measuring device 520. Further, there is no need to equip the measured object 530 with markers 154, which can be time-consuming. Instead, a single object with markers 154 is required that is used by the first measuring device. Further, the path of the robot 144 can be adjusted already during the operation based on the reference poses recorded using the first measuring device 120.

In one or more embodiments, the calibration of the measuring devices 120, 520, and also that of the tracking device 160 may be maintained for the accurate operation of the system 500 (and also system 100). To facilitate addressing such challenges, the predetermined object 150 includes multiple markers 154. While tracking the multiple markers 154, the controller 170 can use the redundancy of measurements of the multiple markers 154 to detect errors in the calibration and to react to the errors. For example, an error could be that two sensors, the measuring device 120 and the measuring device 520, are calibrated with respect to each other, and now they both observe markers that are not at the same position in a common coordinate system. This could be because the relative orientation of the sensors has changed.

In one or more embodiments, in response to detecting such an error, a warning indication can be provided to the user via a user interface of the controller 170, or any other manner. Alternatively, or in addition, a correction of the calibration values can be initiated in response to detecting the error. The correction can be performed by recording the reference poses again as described herein. It should be noted that the calibrations include calibrating the first measuring device 120 to the tracking device 160, calibrating the first measuring device 120 to the second measuring device 520, as well as calibrating the measuring device 120 (or measuring device 520) and the user.

Figure 8:
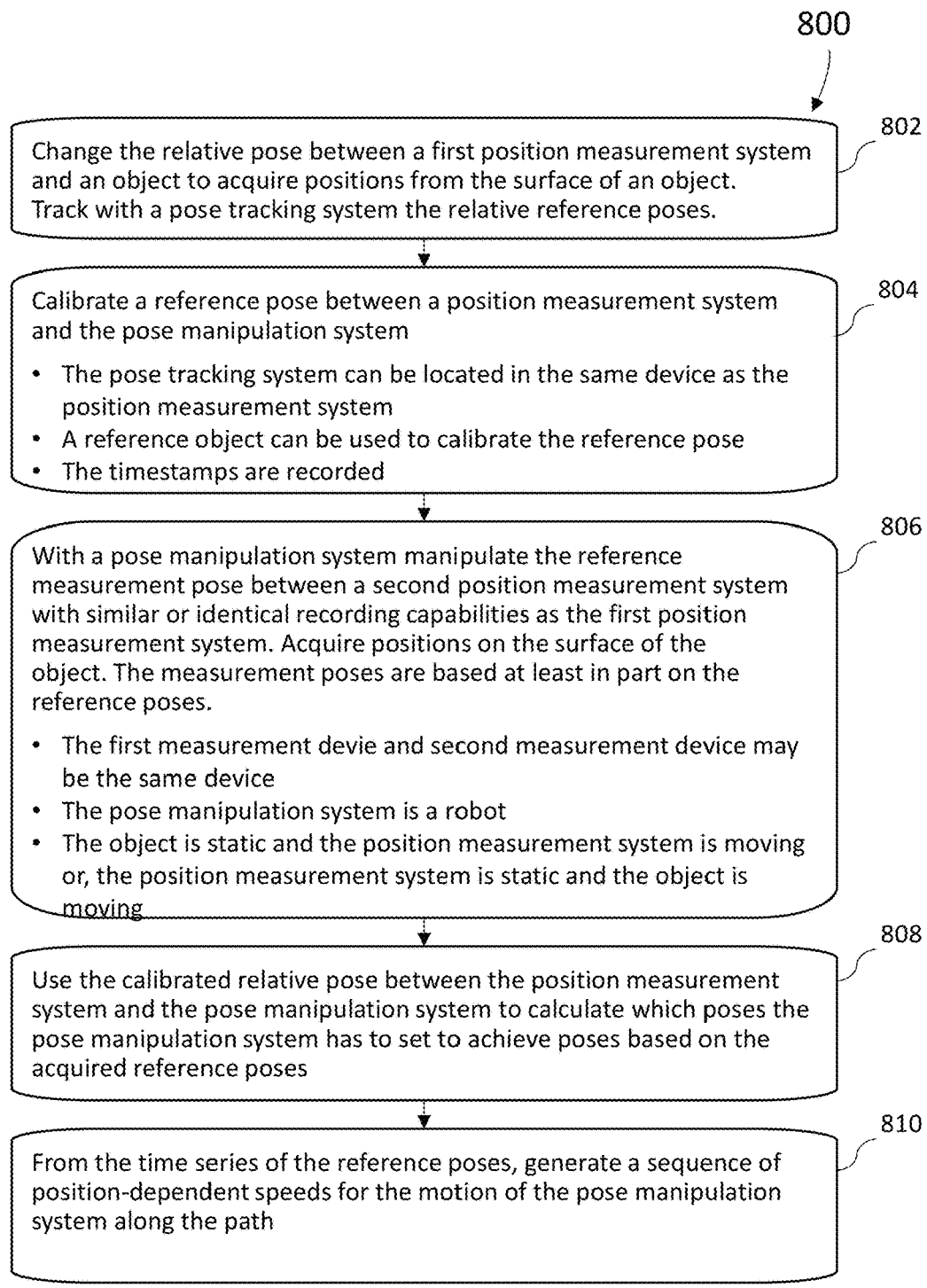
FIG. 8 depicts a flowchart of a method for recording reference poses of a measuring device according to one or more embodiments of the present invention.

FIG. 8 depicts a flowchart of a method for recording poses of a measurement device according to one or more embodiments of the present invention. The method 800 from FIG. 8 is described with reference to the system 100. The method 800 includes changing the relative pose between the measuring device 120 and the object 150 to acquire positions from the surface of the object 150, at block 802. The relative pose can be changed manually in an embodiment. For example, the position manipulation system, such as the robot 144, can be guided through a series of poses at which the measuring device 120 acquires a position from the surface of the object 150. It should be noted that this method to "train" the system using reference poses is carried out by first moving a measurement device, such as the measurement device 120, to desired positions using a pose manipulation system, such as the robot 144. The pose manipulation system can be moved to the desired reference poses using handheld operations in one or more embodiments. The measured poses of the measurement device 120, from this path followed by the pose manipulation system, are stored and transferred to the pose manipulation system, such as the robot 144 for subsequent operations.

In an embodiment, the method 800 includes calibrating a reference pose between the pose manipulation system and the measuring device, at block 804. It should be noted that the pose tracking system 160 and the measuring device 120 can be the same device. In an embodiment, the relative pose can be calibrated using a reference object 150 with photogrammetric markers 154 attached to it. The reference object 150 is of substantially the same shape and size as the objects that are to be inspected by the measuring device 120. In an embodiment, the object to be measured is used as the reference object as well. In an embodiment, a timestamp is recorded at each pose along the path where a position measurement is acquired. The timestamp, pose, and the acquired position can be stored as a tuple in an embodiment. Storing the three parts as a tuple can include maintaining an association between the three parts of the data. Alternatively, a data structure can be used that stores the three parts of the data in each instance.

The poses stored as the path are followed by the pose manipulation system and the measuring device 120 when inspecting another object, at block 806. Additionally, or alternatively, the path can be used to manipulate another (different) pose manipulation system that is coupled with another (different) measuring device. The combination of the other pose manipulation system and the other measuring device has similar or identical capabilities as the original combination. The other measuring device and pose manipulation system combination can be used independent of the original combination to inspect objects that are of substantially similar shape and type as the object 150. The pose manipulation systems can be robots, such as the robot 144, however, as noted herein, other pose manipulation systems are also possible.

In the examples described so far, the pose manipulation system moves the measuring device 120 to change the relative pose between the measuring device 120 and the object 150, which is stationary. However, in other embodiments, the pose manipulation system can move the object 150 to change the relative pose between the object 150 and the measuring device 120, which is kept stationary.

In an embodiment, the controller 170 determines a transition for the pose manipulation system, such as the robot 144, to achieve the reference poses in the stored path, at block 808. The controller determines the transitions using a calibrated relative pose between the measuring device 120 and the pose manipulation system. For example, the calibrated pose can be used as a starting pose from which the pose manipulation system is moved to a first pose from the stored path.

In an embodiment, the controller 170 generates a sequence of position-dependent speeds for the motion of the pose manipulation system along the stored path of reference poses, at block 810. The sequence of position-dependent speeds can be determined based on the timestamps associated with the reference poses. For example, the pose manipulation system may have to be moved slower along certain poses compared to other poses. This may be to facilitate the measuring device 120 to acquire additional number of positions in the poses associated with the slower speed. Alternatively, or in addition, the slower speed may facilitate a more accurate acquisition of one or more positions, for example, by reducing shaking, blurring, or other such factors that can adversely affect the acquisition of the positions.

Figure 9:
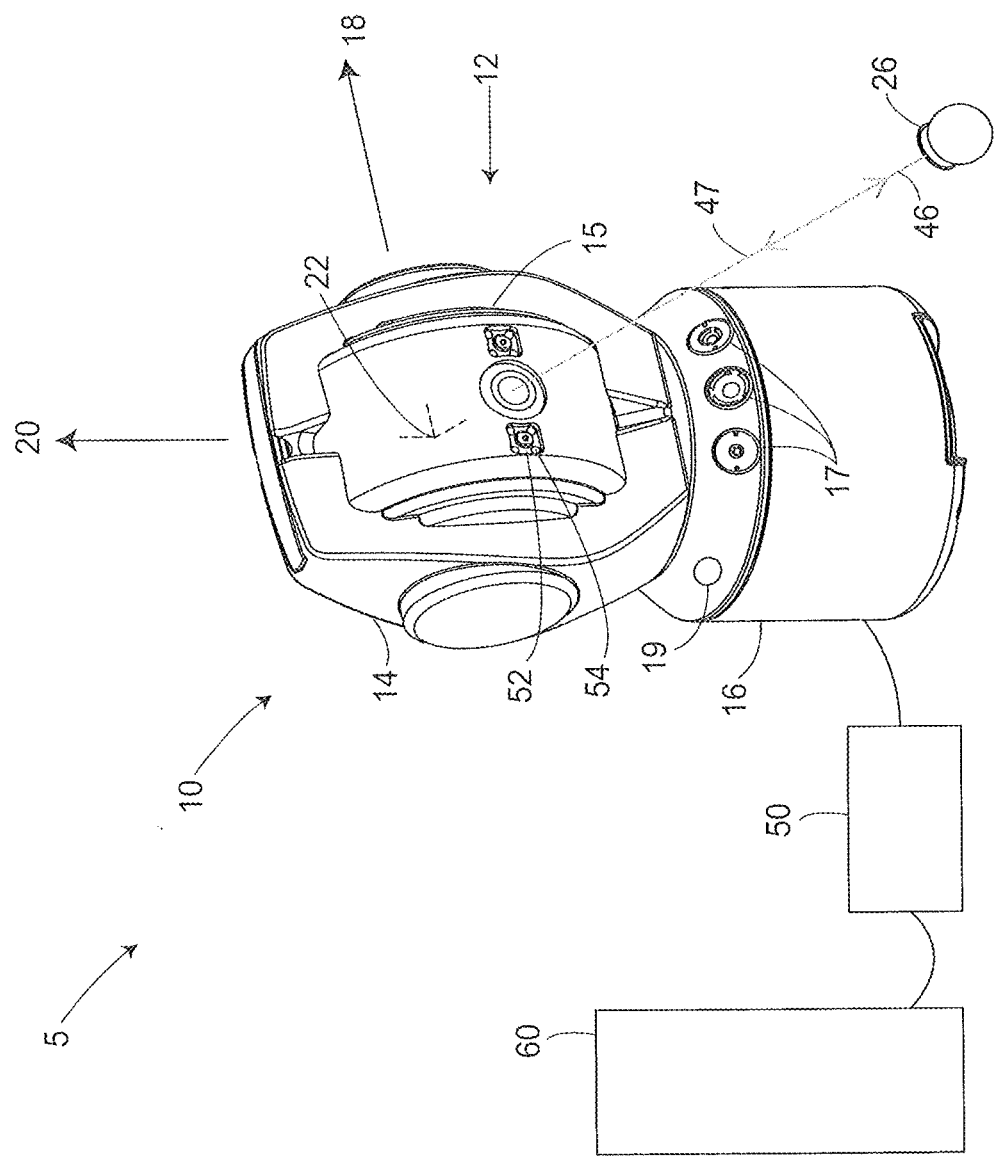
FIG. 9 depicts a block diagram of a position sensor according to one or more embodiments.

Referring now to FIG. 9, a block diagram of a laser tracker or position sensor 700 is depicted according to one or more embodiments. The sensor 700 can be used as the measuring device 120, tracking device 160, or measuring device 520 described herein. The sensor 700 is a coordinate measuring device that measures the three-dimensional (3D) coordinates of a point by sending a laser beam to the point. The laser beam may impinge directly on the point or on a retroreflector target (marker 154) in contact with the point. In either case, the instrument determines the coordinates of the point by measuring the distance and two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

An exemplary laser tracker system 5 illustrated in FIG. 9 includes a laser tracker 10, a retroreflector target 26, which is a type of marker 154. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths. For the sake of clarity and simplicity, a steering mechanism of the sort shown in FIG. 9 is assumed in the examples herein, however, other types of steering mechanisms are possible. For example, it is possible to reflect a laser beam off a mirror rotated about the azimuth and zenith axes. The techniques described herein are applicable, regardless of the type of steering mechanism. Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 9, may be used in combination with the on-tracker retroreflector to enable performance of a self-compensation, as described in U.S. Pat. No. 7,327,446 ('446), the contents of which are incorporated herein by reference. It is understood that the laser tracker system 5 is one possible example of the measuring device 120, and that other types of measuring devices 120 can be used in one or more embodiments.

For example, triangulation can also be used to measure 3D coordinates projects onto a surface, either a pattern of light in a line (e.g., a laser line from a laser line probe) or a pattern of light covering an area (e.g., structured light) onto the surface. A camera is coupled to the projector in a fixed relationship, by attaching a camera and the projector to a common frame for example. The light emitted from the projector is reflected off of the surface and detected by the camera. Since the camera and projector are arranged in a fixed relationship, the distance to the object may be determined using trigonometric principles. Compared to coordinate measurement devices that use tactile probes, triangulation systems provide advantages in quickly acquiring coordinate data over a large area. As used herein, the resulting collection of three-dimensional coordinate values provided by the triangulation system is referred to as a point cloud data or simply a point cloud.

Figure 10:
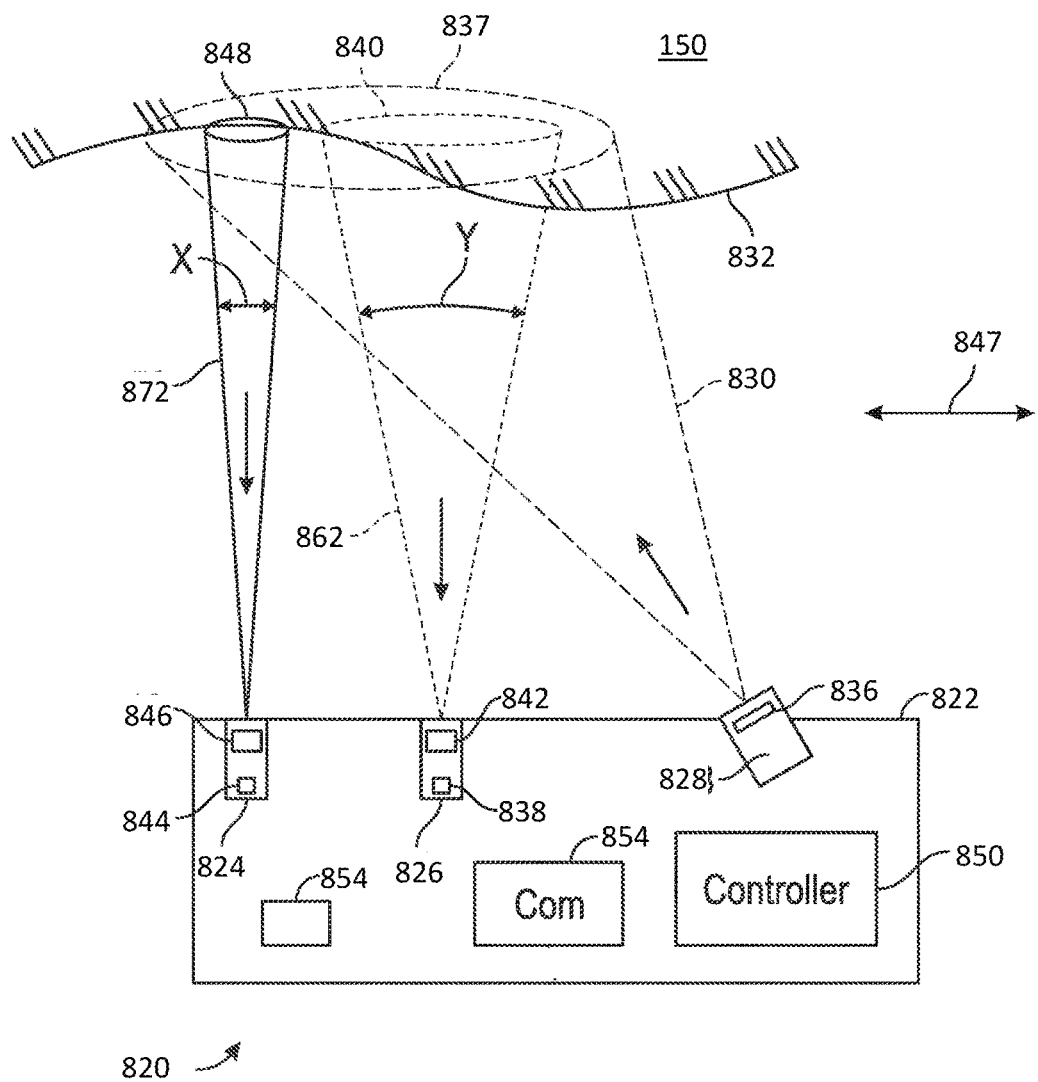
FIG. 10 depicts a block diagram of a position sensor according to one or more embodiments.

FIG. 10 depicts an example scanner using triangulation according to one or more embodiments. A scanner 820 shown in FIG. 10 has a housing 822 that includes a first camera 824, a second camera 826, and a projector 828. The projector 828 emits light 830 onto a surface 832 of the object 150. In the exemplary embodiment, the projector 828 uses a visible light source that illuminates a pattern generator. The visible light source may be a laser, a super luminescent diode, an incandescent light, a Xenon lamp, a light emitting diode (LED), or other light emitting device for example. In one embodiment, the pattern generator is a chrome-on-glass slide having a structured light pattern etched thereon. The slide may have a single pattern or multiple patterns that move in and out of position as needed. The slide may be manually or automatically installed in the operating position. In other embodiments, the source pattern may be light reflected off or transmitted by a digital micro-mirror device (DMD) such as a digital light projector (DLP) manufactured by Texas Instruments Corporation, a liquid crystal device (LCD), a liquid crystal on silicon (LCOS) device, or a similar device used in transmission mode rather than reflection mode. The projector 828 may further include a lens system 836 that alters the outgoing light to cover the desired area.

In this embodiment, the projector 828 is configurable to emit a structured light over an area 837. As used herein, the term "structured light" refers to a two-dimensional pattern of light projected onto an area of an object that conveys information which may be used to determine coordinates of points on the object. In one embodiment, a structured light pattern will contain at least three non-collinear pattern elements disposed within the area. Each of the three non-collinear pattern elements conveys information which may be used to determine the point coordinates. In another embodiment, a projector is provided that is configurable to project both an area pattern as well as a line pattern. In one embodiment, the projector is a digital micromirror device (DMD), which is configured to switch back and forth between the two. In one embodiment, the DMD projector may also sweep a line or to sweep a point in a raster pattern.

In general, there are two types of structured light patterns, a coded light pattern and an uncoded light pattern. As used herein a coded light pattern is one in which the three-dimensional coordinates of an illuminated surface of the object are found by acquiring a single image. With a coded light pattern, it is possible to obtain and register point cloud data while the projecting device is moving relative to the object. One type of coded light pattern contains a set of elements (e.g. geometric shapes) arranged in lines where at least three of the elements are non-collinear. Such pattern elements are recognizable because of their arrangement.

In contrast, an uncoded structured light pattern as used herein is a pattern that does not allow measurement through a single pattern. A series of uncoded light patterns may be projected and imaged sequentially. For this case, it is usually necessary to hold the projector fixed relative to the object.

It should be appreciated that the scanner 20 may use either coded or uncoded structured light patterns. The structured light pattern may include the patterns disclosed in the journal article "DLP-Based Structured Light 3D Imaging Technologies and Applications" by Jason Geng published in the Proceedings of SPIE, Vol. 7932, which is incorporated herein by reference. In addition, in some embodiments described herein below, the projector 828 transmits a pattern formed a swept line of light or a swept point of light. Swept lines and points of light provide advantages over areas of light in identifying some types of anomalies such as multipath interference. Sweeping the line automatically while the scanner is held stationary also has advantages in providing a more uniform sampling of surface points.

The first camera 824 includes a photosensitive sensor 844 which generates a digital image/representation of the area 48 within the sensor's field of view. The sensor may be charged-coupled device (CCD) type sensor or a complementary metal-oxide-semiconductor (CMOS) type sensor for example having an array of pixels. The first camera 824 may further include other components, such as but not limited to lens 846 and other optical devices for example. The lens 846 has an associated first focal length. The sensor 44 and lens 46 cooperate to define a first field of view "X". In the exemplary embodiment, the first field of view "X" is 16 degrees (0.28 inch per inch).

Similarly, the second camera 826 includes a photosensitive sensor 838 which generates a digital image/representation of the area 840 within the sensor's field of view. The sensor may be charged-coupled device (CCD) type sensor or a complementary metal-oxide-semiconductor (CMOS) type sensor for example having an array of pixels. The second camera 826 may further include other components, such as but not limited to lens 842 and other optical devices for example. The lens 842 has an associated second focal length, the second focal length being different than the first focal length. The sensor 838 and lens 842 cooperate to define a second field of view "Y". In the exemplary embodiment, the second field of view "Y" is 50 degrees (0.85 inch per inch). The second field of view Y is larger than the first field of view X. Similarly, the area 840 is larger than the area 848. It should be appreciated that a larger field of view allows acquired a given region of the object surface 832 to be measured faster; however, if the photosensitive arrays 844 and 838 have the same number of pixels, a smaller field of view will provide higher resolution.

In the exemplary embodiment, the projector 828 and the first camera 824 are arranged in a fixed relationship at an angle such that the sensor 844 may receive light reflected from the surface of the object 150. Similarly, the projector 828 and the second camera 826 are arranged in a fixed relationship at an angle such that the sensor 838 may receive light reflected from the surface 832 of object 150. Since the projector 828, first camera 824 and second camera 826 have fixed geometric relationships, the distance and the coordinates of points on the surface may be determined by their trigonometric relationships. Although the fields-of-view (FOVs) of the cameras 824 and 826 are shown not to overlap in FIG. 10, the FOVs may partially overlap or totally overlap.

The projector 828 and cameras 824, 826 are electrically coupled to a controller 170 disposed within the housing 822. The controller 170 may include one or more microprocessors, digital signal processors, memory and signal conditioning circuits. The scanner 820 may further include actuators (not shown) which may be manually activated by the operator to initiate operation and data capture by the scanner 820. In one embodiment, the image processing to determine the X, Y, Z coordinate data of the point cloud representing the surface 832 of object 150 is performed by the controller 170. The coordinate data may be stored locally such as in a volatile or nonvolatile memory 854 for example. The memory may be removable, such as a flash drive or a memory card for example. In other embodiments, the scanner 20 has a communications circuit 852 that allows the scanner 20 to transmit the coordinate data to a remote processing system 856. The communications medium 858 between the scanner 820 and the remote controller 170 may be wired (e.g. Ethernet) or wireless (e.g. Bluetooth, IEEE 802.11). In one embodiment, the coordinate data is determined by the controller 170 based on acquired images transmitted by the scanner 820 over the communications medium 858.

A relative motion is possible between the object surface 832 and the scanner 820, as indicated by the bidirectional arrow 847. There are several ways in which such relative motion may be provided. In an embodiment, the scanner is a handheld scanner and the object 150 is fixed. Relative motion is provided by moving the scanner over the object surface. In another embodiment, the scanner is attached to a robotic end effector. Relative motion is provided by the robot as it moves the scanner over the object surface. In another embodiment, either the scanner 820 or the object 150 is attached to a moving mechanical mechanism, for example, a gantry coordinate measurement machine or an articulated arm CMM. Relative motion is provided by the moving mechanical mechanism as it moves the scanner 820 over the object surface. In some embodiments, motion is provided by the action of an operator and in other embodiments, motion is provided by a mechanism that is under computer control.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
a pose manipulation system operationally coupled to a position measurement system, wherein the pose manipulation system is configured to set a pose of the position measurement system with respect to an object that is to be measured, wherein the position measurement system measures a three-dimensional (3D) coordinate of a point in space;
a pose tracking system configured to record a relative pose between a coordinate system associated with the position measurement system and a coordinate system of the object; wherein:
the pose tracking system records a path along which the position measurement system is enabled to measure 3D coordinates of a surface of a type of an object, wherein recording the path comprises moving the pose manipulation system sequentially through a plurality of poses and recording, at each pose, the relative pose to measure the 3D coordinates; and
the pose manipulation system follows the path again, and the position measurement system measures the 3D coordinates of the surface of the object by applying one or more of the recorded poses,
wherein:
the position measurement system is a first position measurement system, and the pose manipulation system can manipulate the relative pose between a second position measurement system and an object, and wherein:
a fixed relative pose is calibrated between the second position measurement system and the pose manipulation system; and
the pose manipulation system changes the relative pose between the second position measurement system and an object according to relative poses in the recorded path at which the second position measurement system acquires measurements of the object.

2. The system of claim 1, wherein the position measurement system and the pose tracking system are calibrated to facilitate the pose tracking system to determine a pose of the position measurement system in a coordinate system of the object.

3. The system of claim 1, wherein the pose manipulation system manipulates the object and the position measurement system is static.

4. The system of claim 1 wherein the pose manipulation system manipulates the pose of the position measurement system and the object is static.

5. The system of claim 1, wherein each pose in the recorded path comprises a position and an orientation of the position measurement system.

6. The system of claim 5, wherein each pose further comprises a timestamp at which the pose is recorded.

7. The system of claim 5, wherein each measured position further comprises a timestamp at which the position is recorded.

8. The system of claim 1, wherein the poses measured by the pose tracking system are in a coordinate system of the object.

9. The system of claim 1, wherein the pose of the position measurement system is recorded using one or more markers.

10. The system of claim 1, wherein a single device comprises the position measurement system and the pose tracking system.

11. The system of claim 1, wherein the position measurement system and the pose tracking system are rigidly coupled with each other.

12. The system of claim 1, wherein the pose manipulation system is one from a group comprising an articulated arm robot, a automatically guided vehicle, a conveyor belt, and a roll conveyor.

13. The system of claim 1, wherein the pose tracking system comprises one of a laser-based pose tracking system and a camera-based pose tracking system.

14. A method for calibration of a pose manipulation system for tracking a position measurement system, the method comprising:
recording a path of relative poses the pose manipulation system sets to perform an operation to acquire three-dimensional (3D) coordinates of a surface of a type of an object by a position measurement system, wherein recording the path comprises:
moving the pose manipulation system sequentially through a plurality of relative poses between a position measurement system and an object, at which the position measurement system measures the 3D coordinates of the object to operate on and the pose tracking system records a relative pose; and
performing the operation on one or more objects of said type by causing the pose manipulation system to move sequentially along the poses in the path, and the position measurement system measuring the 3D coordinates and applying the recorded poses,
wherein:
the position measurement system is a first position measurement system, and the pose manipulation system can manipulate the relative pose between a second position measurement system and an object, and wherein:
a fixed relative pose is calibrated between the second position measurement system and the pose manipulation system; and
the pose manipulation system changes the relative pose between the second position measurement system and an object according to relative poses in the recorded path at which the second position measurement system acquires measurements of the object.

15. The method of claim 14, wherein the pose manipulation system manipulates the object and the position measurement system is static.

16. The method of claim 14, wherein the position measurement system is manipulated by the pose manipulation system and the object is static.

17. The method of claim 14, wherein each pose comprises a position and an orientation of the position measurement system, and a timestamp at which the pose is recorded.

18. The method of claim 14, wherein a marker is attached to a placeholder of the predetermined object.

19. The method of claim 14, wherein the position measurement system comprises an array of position sensors attached to the pose manipulation system.

20. The method of claim 14, wherein the position measurement system comprises one of a laser-based pose tracking system and a camera-based position measurement system.

21. The method of claim 14, wherein the recorded poses are used to transform the 3D coordinates measured by the position measurement system to be in a common coordinate system.

22. A computer program product comprising a memory device having computer executable instructions stored thereon, the computer executable instructions when executed by one or more processors perform a method comprising:

recording a path of the pose manipulation system to perform an operation to acquire three-dimensional (3D) coordinates of a surface of a type of an object by a position measurement system, wherein recording the path comprises:

moving the pose manipulation system sequentially through a plurality of relative poses between a position measurement system and an object, at which the position measurement system is enabled to measure the 3D coordinates of the object to operate on; and performing the operation on one or more objects of said type by causing the pose manipulation system to move sequentially along the poses in the path, and the position measurement system measuring the 3D coordinates using one or more poses, wherein:

the position measurement system is a first position measurement system, and the pose manipulation system can manipulate the relative pose between a second position measurement system and an object, and wherein;

a fixed relative pose is calibrated between the second position measurement system and the pose manipulation system; and the pose manipulation system changes the relative pose between the second position measurement system and an object according to relative poses in the recorded path at which the second position measurement system acquires measurements of the object.

\* \* \* \* \*